United States Patent [19]

Weinhold

[11] Patent Number: 5,060,668
[45] Date of Patent: Oct. 29, 1991

[54] DEVICE FOR THE PRODUCTION OF AT LEAST TWO ADJACENT ROWS OF PERFORATIONS IN CIGARETTES AND/OR FILTER-LINING PAPER OR FILTER-WRAPPING PAPER

[75] Inventor: Friedrich Weinhold, Norderstedt, Fed. Rep. of Germany

[73] Assignee: B. A. T. Cigaretten-Fabriken GmbH, Hamburg, Fed. Rep. of Germany

[21] Appl. No.: 734,356

[22] Filed: May 14, 1985

[30] Foreign Application Priority Data

May 16, 1984 [DE] Fed. Rep. of Germany ....... 3418188

[51] Int. Cl.$^5$ .......................... A24C 5/00; A24C 5/60
[52] U.S. Cl. ................................................. 131/281
[58] Field of Search ................................. 131/281, 280

[56] References Cited

U.S. PATENT DOCUMENTS 4,390,032  6/1983  Labbe et al. .................... 131/281
4,499,361  2/1985  Brinker ............................ 131/281

FOREIGN PATENT DOCUMENTS 3218739  4/1982  Fed. Rep. of Germany .
56-110902  9/1981  Japan .
1602133  7/1981  United Kingdom .

Primary Examiner—V. Millin
Attorney, Agent, or Firm—Armstrong, Nikaido, Marmelstein, Kubovcik & Murray

[57] ABSTRACT

A device for the production of at least two adjacent perforation rows in cigarettes and/or filter-lining paper or filter-wrapping paper comprises a pulsed laser light source with mirrors as well as an optical element which serves for both beam splitting and focusing of the produced partial beams. This optical element with two foci is preferably ground out of a collecting-lens blank or is formed from two parts of a collecting lens, which are combined to form the optical element. In one embodiment this optical element consists of the two equal havles of a collecting lens cut perpendicularly to the center plane thereof, which halves were displaced relative to each other and then combined again. As an alternative thereto, a central area of the output collecting lens running in the direction of the center plane can be cut out and the remaining peripheral portions can be combined, by means of which an optical element with two foci also results. A cigarette paper is moved in a plane of both foci such that the pulsed beam portion at each focus forms a row of perforations in the paper.

3 Claims, 3 Drawing Sheets

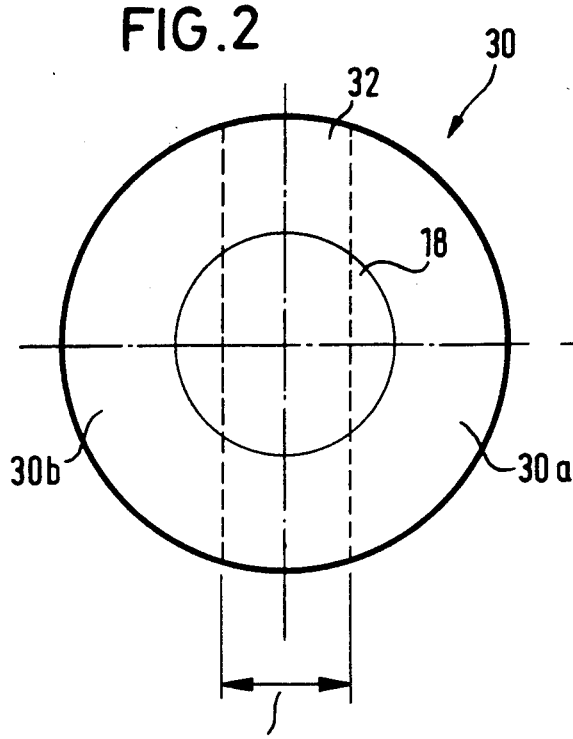
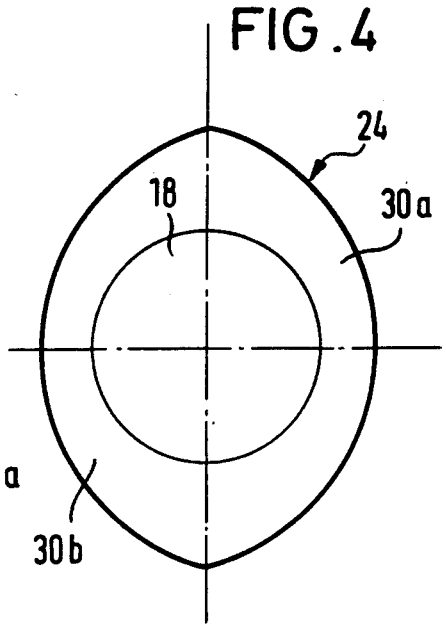
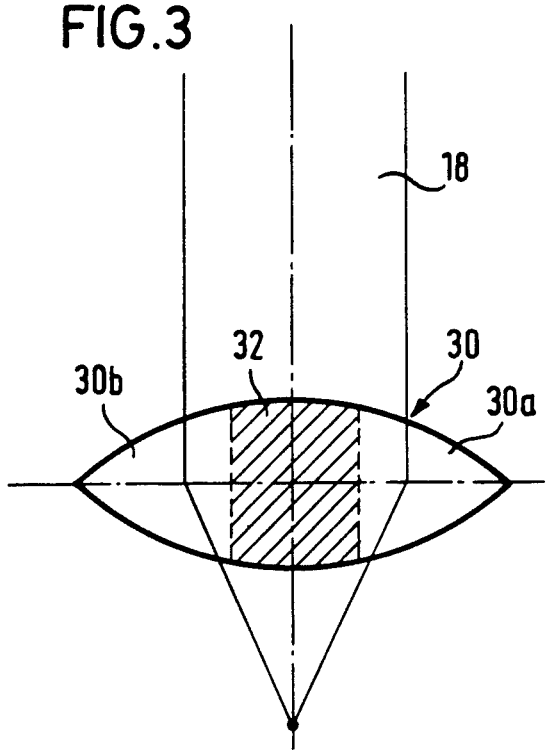
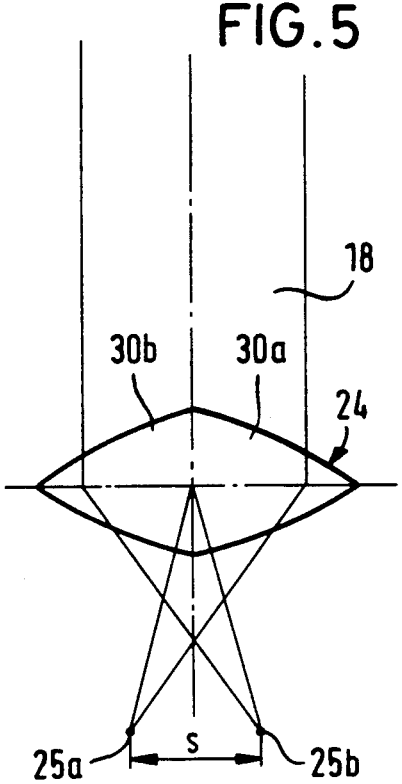

DEVICE FOR THE PRODUCTION OF AT LEAST TWO ADJACENT ROWS OF PERFORATIONS IN CIGARETTES AND/OR FILTER-LINING PAPER OR FILTER-WRAPPING PAPER

BACKGROUND OF THE INVENTION

1. Field of the Invention

The present invention relates to a device for the production of at least two adjacent perforation rows in cigarettes and/or filter-lining paper or filter-wrapping paper, using a laser light source.

2. Description of the Prior Art

In connection with the introduction of ventilated cigarettes a number of different methods have been developed for the production of the perforation zones which consist of a row of ventilation holes and/or slots.

In practise, basically two methods are used, i.e. the electrostatic perforation or the perforation with a pulsed or focused laser beam. Either the wrapping materials, that is the filter-lining paper or filter-wrapping paper, or the finished cigarettes are perforated.

The wrapping materials are perforated either on separate machines which are not integrated into the procedure of a production installation (off-line), or during the production of the cigarettes themselves (on-line).

Finished double-length filter cigarettes are perforated during production, i.e. on-line, in that either the individual holes are produced consecutively by means of one laser pulse each or all of the holes of the cigarette are produced simultaneously by one laser pulse each. Thus, for each individual cigarette a single row of successive perforations is produced. In the case of a pulsed laser the cigarette has to be rotated by 360° about its longitudinal axis. For this purpose solutions are known, some of which require a great deal of time and effort.

One or several rows of perforation zones can be produced in the wrapping materials, i.e. the filter-lining or filter-wrapping paper. Moreover, it is known for finished individual cigarettes to provide by means of pulsed laser double-rowed perforation zones.

In both cases the beam originating from a laser light source is divided into two partial beams by means of a beam splitter, namely a part-reflecting mirror, which partial beams are then directed towards the wrapping material or the finished cigarette, respectively, each by means of a focusing lens element. Thus, one focusing lens element is required for each partial beam.

Several beam splitters can be connected one after the other for the perforation of wrapping materials so that more than two perforation rows can be formed also. This is not easily possible with the perforation of finished cigarettes in the filter attachement machine, since the beam splitters with lenses require a relatively great deal of space and thus cannot be accommodated in a conventional production installation.

SUMMARY OF THE INVENTION

Therefore, the invention is based on the object to provide a device for the production of at least two adjacent perforation rows per cigarette and/or paper web of the specified category, in which the above-mentioned disadvantages do not occur.

In particular, a device is to be proposed with which can be produced and at the same time focused at least two partial beams by means of a single optical element without any difficulty and in a small space.

According to the invention this object is achieved by a device for the production of perforation rows, in which at least one beam splitter for the formation of at least two partial beams from the initial beam of the laser light source and a focusing lens element are formed by a single, optical element with at least two foci, which element consists of at least two areas of a light collecting lens.

Advantageous forms of embodiment are listed in the subordinate claims.

The advantages obtained by the invention are based on the exploitation of the fact that each portion of a light collecting lens has its own focus; these foci coincide when the individual portions are combined in the usual manner to from a collecting lens; however, they do not coincide when the individual portions of the collecting lens are formed or combined in a different manner, for instance when they are displaced relative to each other so that there are then at least two foci.

Thus, optical elements with at least two foci can be realized. This optical element, which consists of at least two portions of a collecting lens, functions as both beam splitter and focusing device and requires only little space so that it can be also built into existing production installations at a later date. Hence, existing installations can also be reequipped without anything else having to be changed.

Due to the low space requirement it is, for instance, also possible to produce two partial beams using the part-reflecting mirrors provided in laser-perforation systems, which beams are then split into four partial beams by means of the device of the invention. Thus, for instance, two adjacent perforation rows can be produced in each filter part of a double-length filter cigarette.

The light intensity of each partial beam in the focus corresponds to that part of the laser beam which impinges the lens portion belonging to this focus.

The focal points in the two foci of such an optical element are not circular; this is not disadvantageous, however, for the production of perfect perforation holes.

BRIEF DESCRIPTION OF THE DRAWINGS

The invention is described in more detail hereinafter with the help of examples of embodiment with reference to the accompanying diagrammatic drawings. In these drawings FIG. 2 shows a plan view of a collecting lens, FIG. 3 shows a side view of the collecting lens according to FIG. 2, FIG. 4 shows a plan view of a first form of embodiment of an optical element with two foci, FIG. 5 shows a side view of the optical element according to FIG. 4.

DESCRIPTION OF THE PREFFERED EMBODIMENT

Figure 1:
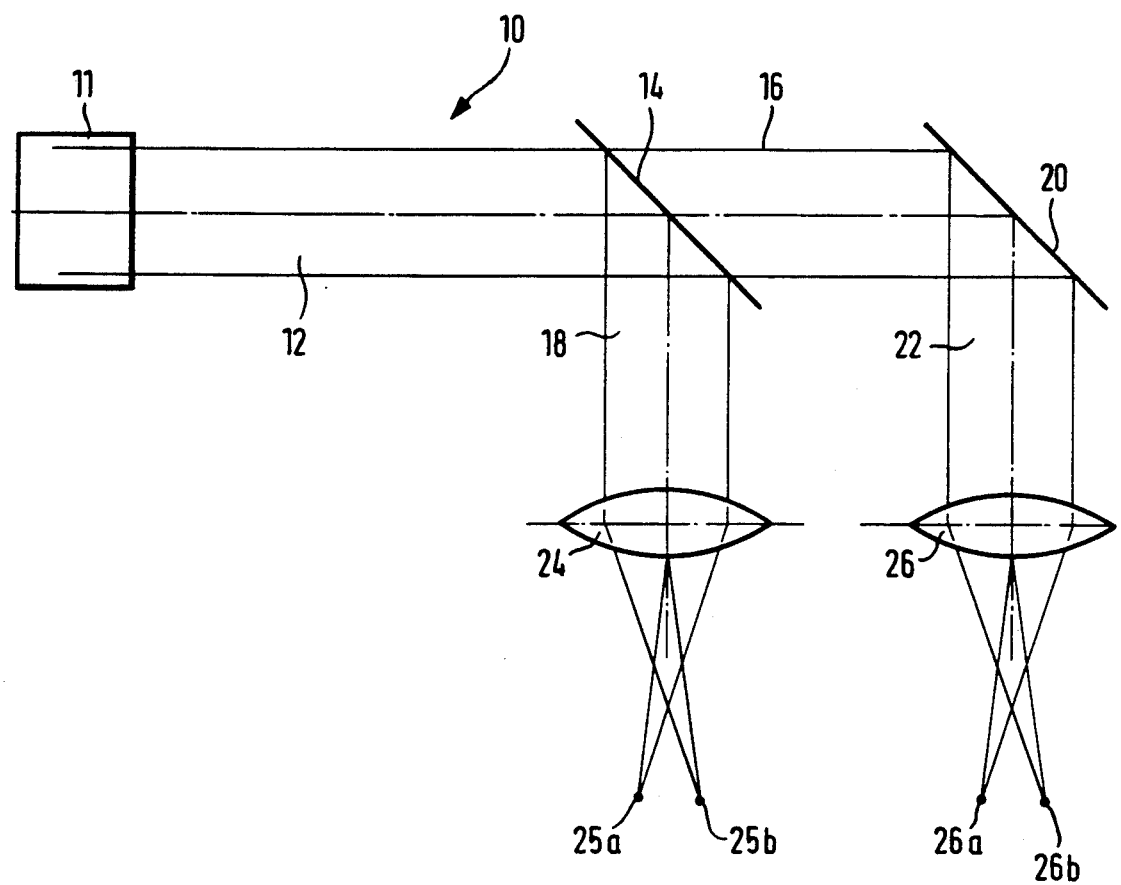
FIG. 1 shows a principle representation of the device according to the invention for the production of four adjacent perforation rows using an existing, conventional laser perforation system.

The device, which can be seen from FIG. 1 and is designated generally by reference number 10, for the production of four adjacent perforation rows in cigarettes and/or filter-lining paper or filter-wrapping paper comprises a commercially available laser light source 11 which produces a parallel laser beam 12. Said laser beam 12 is split on a part-reflecting mirror 14 into a first, reflected partial beam 18 and a second, transmitted partial beam 16. The transmitted partial beam 16 impinges onto a second, totally reflecting mirror 20 which provides a second, reflected partial beam 22 which extends parallel to the partial beam 18.

In the shown form of embodiment the two mirrors 14, 20 are arranged at an angle of 45° in the direction of the laser beam 12 so that the two partial beams 18, 22 are deflected by 90° relative to the laser light beam 12, as is required in cigarette makers for reasons of space.

The above-described configuration of laser light source 11 and the two mirrors 14, 20 can be obtained on the market in combination with commercially available collecting lenses for focusing the two partial beams 18, 22 and can produce two parallel perforation rows of individual perforation holes, if the laser light source 11 is operated in a pulsing manner.

In the device 10 according to FIG. 1, however, the two focusing collecting lenses are replaced by new optical elements 24, 26 still to be explained which split each of the two partial beams 18, 22 into another two partial beams with two foci 25a, 25b and 26a, 26b, respectively, so that a total of four perforation rows can be produced by simply replacing the commercially available collecting lenses by the new optical elements 24, 26.

With reference to FIGS. 2 to 5, a first embodiment of the optical element 24, 26, is to be first described. FIGS. 2 and 3 show a conventional, biconvex collecting lens which has a circular shape when looked at from above (see FIG. 2) and consists of two equal halves, as can be recognized in FIG. 3.

If then such a conventional collecting lens 30 as according to FIG. 2 is cut into three parts 30a, 30b and 32, that is into a central portion 32 and two peripheral portions 30a and 30b and if—with the omission of the central portion 32—the two peripheral portions 30a and 30b are combined, as can be seen from FIGS. 4 and 5, then an optical element 24 is formed which produces from the pertinent partial beam 18 two further focusing partial beams with the foci 25a and 25b.

An optical element 24, 26 can preferably be obtained from a homogenous, one-piece blank or base material by means of appropriate grinding or and other working method.

Figure 6:
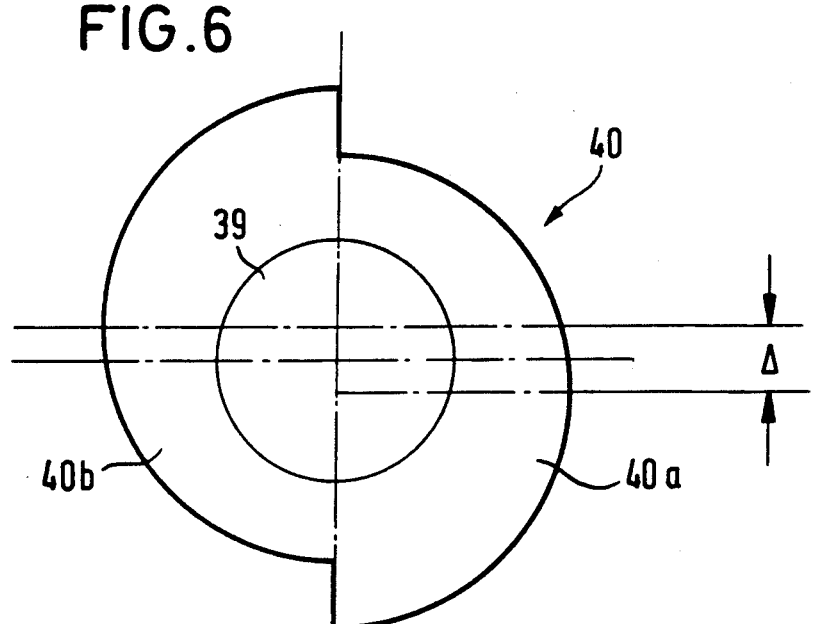
FIG. 6 shows a plan view of a second form of embodiment of an optical element.
Figure 7:
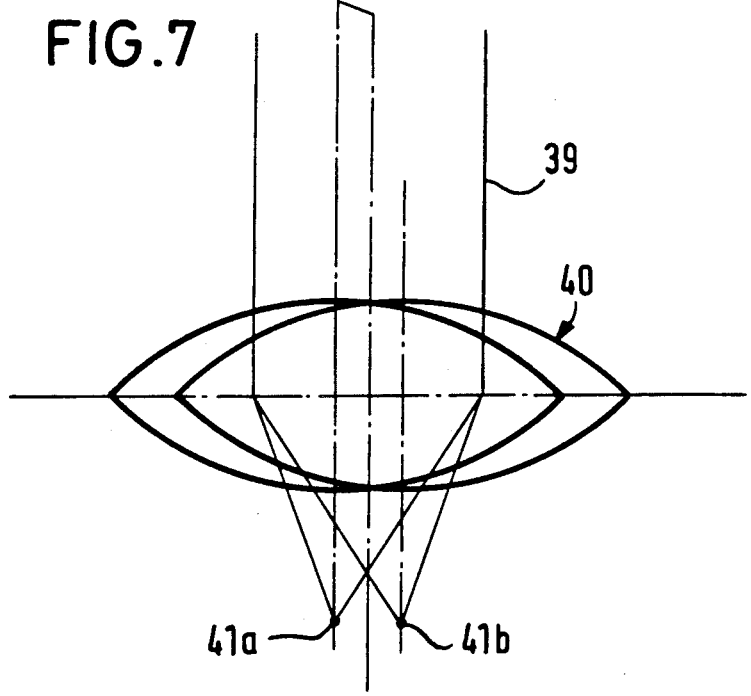
FIG. 7 shows a side view of the optical element according to FIG. 6.

FIGS. 6 and 7 show a variant in which a conventional collecting lens 40, as represented in FIG. 2, is cut along its center line and split into two equal halves 40a, 40b. These two halves are subsequently displaced at their adjoining areas by distance Δ and combined, as is discernible from FIGS. 6 and 7, by means of which a composite, optical element is formed which produces from a partial beam 39 two partial beams with the foci 41a, 41b.

In case of need, more than three parts or areas of a collecting lens 30 can also be combined in the manner described or ground out of a blank and thus more than two partial beams can also be produced from a single partial beam.

This optical element can be used in conventional cigarette machines for both the production of at least two perforation rows in filter-lining paper or filter-wrapping paper and the production of at least two perforation rows in finished cigarettes. Every two cigarettes are connected to each other via a double filter so that at least two perforation rows can be produced in each filter. The double-length filter cigarettes are thereafter cut apart, thus producing two individual filter cigarettes.

The described forms of the optical elements 24, 26 can be obtained in that each of them is ground from a light collecting-lens blank 30 in the appropriate manner. As an alternative thereto it is also possible to cut apart a collecting lens 30 in the manner described and then firmly join the individual parts 30a, 30b and 40a, 40b, respectively, for instance, by means of glueing of pasting. Moreover, the individual parts 30a, 30b and 40a, 40b, respectively, can also be movably coonnected to each other, that is to say, the parts can be displaced relative to each other, thus making possible a change in the distance of the produced foci.

In the embodiment of the optical element 24 as according to FIGS. 4 and 5, the distance between the two foci 25a, 25b depends on the width of the cuttings 32 or the contour produced by the grinding and can thus be adapted in accordance with the requirements made.

In the embodiment as according to FIGS. 6 and 7 the distance between the two foci 41a, 41b depends on the displacement between the two halves 40a, 40b.

Those glasses suited for laser light, especially for $CO_2$ laser light of a wave length of 10.6 $\mu$m can be used as the material for the optical elements. Good results are obtained with optical elements 24, 26 made of zinc selenide (ZnSe) glass.

I claim:

1. A device for the production of at least two adjacent perforation rows in a cigarette paper comprising:
   a pulsed laser light source;
   a first lens formed of at least two contiguously joined lens elements, each lens element having a focus, the lens elements being positioned with respect to each other so that their foci fall in a plane at points separated from each other;
   means for moving a cigarette paper linearly in the plane of said foci; and
   means for directing a pulsed laser light beam from said light source on said first lens so that at least a portion of said beam impinges on each lens element such that a beam portion is focussed by each lens element, whereby said pulsed beam portions form rows of perforations in said paper at said foci.

2. Device according to claim 1 in which said lens is biconvex.

3. A device as set forth in claim 1, further comprising:
   A second lens element formed of at least two contiguously joined lens elements each having a focus, the lens elements being positioned with respect to each other such that their foci fall in said plane at points separated from each other, said second lens being located in a common plane with said first lens; and
   a beam splitting means in said pulsed laser light beam arranged to direct a first portion of said beam on said first lens and a second portion of said beam on said second lens so that portions of said laser light beam impinge on each lens element of said first and second lenses,
   wherein said cigarette paper is moved through the foci of each lens such that a plurality of rows of perforations corresponding to each of the foci of said lenses are formed in said paper.

* * * * *